United States Patent [19]

Ito

[11] Patent Number: 4,843,458

[45] Date of Patent: Jun. 27, 1989

[54] METHOD OF PROCESSING IMAGE INFORMATION

[75] Inventor: Takanori Ito, Yokohama, Japan

[73] Assignee: Ricoh Company, Ltd., Tokyo, Japan

[21] Appl. No.: 201,852

[22] Filed: Jun. 3, 1988

[30] Foreign Application Priority Data

Jun. 5, 1987 [JP] Japan .................. 62-140059
Jun. 30, 1987 [JP] Japan .................. 62-161103

[51] Int. Cl.$^4$ .............................................. H04N 1/46
[52] U.S. Cl. ...................................... 358/80; 358/75; 358/280
[58] Field of Search ................... 358/75, 80, 280, 32

[56] References Cited

U.S. PATENT DOCUMENTS

| | | | |
|---|---|---|---|
| 4,346,401 | 8/1982 | Ohara | 358/75 |
| 4,558,356 | 12/1985 | Toda et al. | 358/75 |
| 4,638,372 | 1/1987 | Leng et al. | 358/75 |
| 4,667,228 | 5/1987 | Kawamura et al. | 358/32 |
| 4,700,236 | 10/1987 | Abe | 358/80 |
| 4,711,553 | 12/1987 | Watanabe | 358/75 |
| 4,751,566 | 6/1988 | Pilot | 358/32 |

Primary Examiner—Howard W. Britton
Assistant Examiner—Kim Yen Vu
Attorney, Agent, or Firm—Oblon, Spivak, McClelland, Maier & Neustadt

[57] ABSTRACT

An image information processing method comprises a step of generating electrical color image signals representative of the quantities of light of separated colors from an object, and a step of converting the generated color image signals to signals with values substantially proportional to the cubic root of the quantities of light from the object with respect to the respective separated colors. The method comprises a step of adjusting recording gradation characteristics of respective colors to be recorded such that the values of color image signals to be recorded are substantially proportional to the cubic root of recorded reflectivities, respectively, and a step of determining recording gradations of the respective colors in accordance with the color image signals by using the adjusted recording gradation characteristics.

6 Claims, 12 Drawing Sheets

LEVEL 3

| 99 | 75 | 51 | 54 | 78 | 102 |
|---|---|---|---|---|---|
| 96 | 36 | 30 | 33 | 48 | 81 |
| 72 | 24 | 6 | 12 | 42 | 57 |
| 69 | 21 | 3 | 9 | 39 | 60 |
| 93 | 27 | 15 | 18 | 45 | 84 |
| 108 | 90 | 66 | 63 | 87 | 105 |

LEVEL 2

| 98 | 74 | 50 | 53 | 77 | 101 |
|---|---|---|---|---|---|
| 95 | 35 | 29 | 32 | 47 | 80 |
| 71 | 23 | 5 | 11 | 41 | 56 |
| 68 | 20 | 2 | 8 | 38 | 59 |
| 92 | 26 | 14 | 17 | 44 | 83 |
| 107 | 89 | 65 | 62 | 86 | 104 |

LEVEL 1

| 97 | 73 | 49 | 52 | 76 | 100 |
|---|---|---|---|---|---|
| 94 | 34 | 28 | 31 | 46 | 79 |
| 70 | 22 | 4 | 10 | 40 | 55 |
| 67 | 19 | 1 | 7 | 37 | 58 |
| 91 | 25 | 13 | 16 | 43 | 82 |
| 106 | 88 | 64 | 61 | 85 | 103 |

LEVEL 3

| 60 | 47 | 30 | 33 | 49 | 61 |
|----|----|----|----|----|----|
| 59 | 18 | 15 | 16 | 27 | 50 |
| 45 | 12 | 3  | 6  | 22 | 35 |
| 44 | 10 | 2  | 5  | 20 | 38 |
| 58 | 13 | 7  | 9  | 25 | 53 |
| 63 | 56 | 42 | 40 | 55 | 62 |

LEVEL 2

| 60 | 46 | 29 | 32 | 48 | 61 |
|----|----|----|----|----|----|
| 59 | 17 | 14 | 16 | 26 | 50 |
| 45 | 11 | 3  | 5  | 21 | 34 |
| 43 | 10 | 1  | 4  | 19 | 37 |
| 57 | 13 | 7  | 8  | 24 | 52 |
| 63 | 56 | 41 | 39 | 54 | 62 |

LEVEL 1

| 60 | 46 | 28 | 31 | 48 | 61 |
|----|----|----|----|----|----|
| 58 | 17 | 14 | 15 | 25 | 49 |
| 44 | 11 | 2  | 5  | 21 | 34 |
| 42 | 9  | 1  | 4  | 19 | 36 |
| 57 | 12 | 6  | 8  | 23 | 51 |
| 63 | 55 | 40 | 38 | 54 | 62 |

METHOD OF PROCESSING IMAGE INFORMATION

BACKGROUND OF THE INVENTION

The present invention relates to a method of processing image information of an object to be reproduced. More particularly, the present invention relates to an image information processing method for processing color image signals from an object to be reproduced and/or for processing color image signals to be recorded in a digital color copying machine or a digital color printing machine.

In order to form color image signals with respect to an object such as a landscape, a document, light refelcted by the object is separated into a plurality of light of different colors usually into three (R, G and B) primary colors. Then, the separated light of different colors are received by photodetecting elements such as charge coupled devices (CCDs). The CCDs photoelectrically convert the light to color image signals proportional to the quantity of the reflected light of respective color. Since the magnitude of each of the color image signals is not proportional to a quantity of color perceived by a human, it is necessary to increase the S/N ratio of the color image signal. When such a signal is digitally processed, the number of bits of the signal increases because of redundancy. As a result, the processing device becomes complicated disadvantageously.

In order to decrease the redundancy in the signals, signals received by the CCDs are processed by a logarithmic amplifiers to generate color image signals proportional to the reflection density. However, as will be described in more detail later, even such signals being proportional to reflection density have much redundancy.

For expressing a color, CIE1976L*u*v* and CIE1976L*a*b* uniform color spaces are known. By using such colorimetric systems, it is possible to reduce the redundancy of the color signal. However, in order to convert the color signals received by the CCDs into color signals specifying color in thee systems, it is necessary to perform extremely complicated calculations among the color signals.

For the relationship between image signals to be recorded (recording image signals) and recorded density (reflectivity), so-called Yule-Nielsen equation is known. This Yule-Nielsen equation represents the relationship between a dot area rate a and the printed density D of a print by the following:

$$D = -n\log [1 - a\, 1 - 10^{-Ds/n}]$$

where Ds is the solid inking density, and n is a constant which is set generally to 1 to 2 depending on the number of lines on the screen and a type of printing paper. In the field of plate making process, recording image signal is often expressed by such a dot area rate.

For recording by using a digital printer, a method is known which controls the gradation of record such that the relationship between recording image signals and recorded density becomes linear. This method is carried out by controlling the number of printed dots of a constant size or by changing the dot size.

There are no problems with the above-mentioned printing or recording methods if there are many usable recordable gradations. However, have the problem that if a recordable color space must be covered as uniformly as can with a limited number of gradations, unevenness would increase in the color space. If the number of gradations used is increased, a quantity of signal (the number of bits) to be processed would increase thereby render the processor complicated.

SUMMARY OF THE INVENTION

It is therefore an object of the present invention to provide an image information processing method which is capable of eliminating redundancy from a color image signal obtained by separating light from an object and receiving the separated light.

It is another object of the present invention to provide an image information processing method which, in case where a color image is recorded in a limited number of gradations such as in a digital color copy machine or a digital color printer, is capable of recording colors distributed as uniformly as possible with respect to perception of a human in a recordable color space.

According to the present invention, the above object is achieved by a method of processing image information of an object to be reproduced, comprising the steps of: separating light from the object into a plurality of colors; generating electrical color image signals having levels which represent the quantities of light of the separated colors, respectively; and converting the color image signals to signals having values substantially proportional to the cubic root of the quantities of light from the object with respect to the respective separated colors.

Since each color image signal is converted to a signal substantially proportional to the cubic root of a quantity of light detected by a photodetecting element, unevenness in color differences (dispersion of distribution of color differences each between adjacent lattices) in a formed color space is reduced. Furthermore, as the signals obtained by separating light of colors from the object are only required to be processed individually (the respective signals can be processed separately), conversion is simple and thus a device for required this processing is easy to realize.

According to the present invention, the above object is also achieved by a method of processing image information of an object to be reproduced, comprising the steps of: adjusting recording gradation characteristics of respective colors to be recorded such that the values of color image signals to be recorded are substantially proportional to the cubic root of recorded reflectivities, respectively; determining recording gradations of the respective colors in accordance with the color image signals to be recorded by using the adjusted recording gradation characteristics, respectively; and recording respective color images in accordance with the determined recording gradations.

Since the recording gradation characteristic of cyan, magenta, yellow and black is adjusted such that the values of color image signals to be recorded are substantially proportional to the cubic root of the recorded reflectivities, a uniformly distributed color is recordable for a recordable color space using a limited number of gradation. If the distribution is uniform colors relatively close to all colors can be provided correspondingly even if the number of colors to be recordable is limited by the limited number of gradations, so that color reproducibility is improved.

Further objects and advantages of the present invention will be apparent from the following description, reference being had to the accompanying drawings wherein preferred embodiments of the present invention are clearly shown.

DESCRIPTION OF THE PREFERRED EMBODIMENT

Generation of color image signals will now be described.

First, color separation of light reflected by a color document into three R, G and B colors (for example, using latten filters Nos. 25, 58 and 47) is executed. Then, the values of color image signals proportional substantially to the cubic root of the detected quantity of light are obtained. Why such the color image signals are advantageous will be now described hereinafter.

Figure 1A:
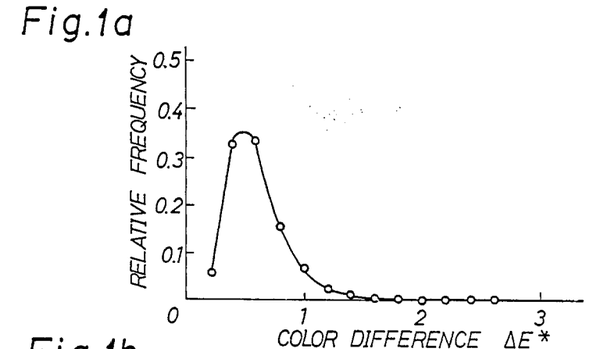
FIGS. 1a, 1b and 1c are color difference distribution characteristics involving a quantity of light detected by a photodetecting element, the logarithm of the quantity of light, and the cubic root of the quantity of light.
Figure 1B:
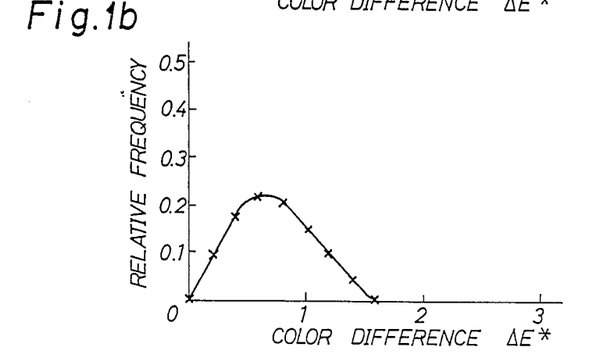
Figure 1C:
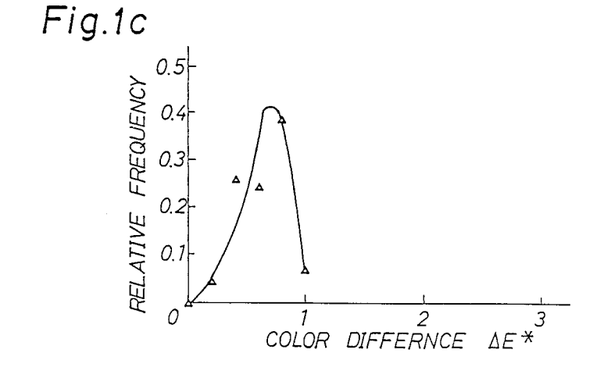

FIGS. 1a and 1b and 1c are distribution diagrams obtained when the color density range of a document detectable by a photodetecting element is set to 0.05 to 1.5 for each of R, G and B, and when (a) a signal having a value proportional to the quantity of light (equivalent to reflectivity) detected by the photodetecting element is quantized with 8 bits (FIG. 1a);

(b) a signal having a value proportional to the logarithm (equivalent to density) of the quantity of light detected by the photodetecting element is quantized with 8 bits (FIG. 1b); and (c) a signal having a value proportional to the cubic root of the quantity of light detected by the photodetecting element is quantized with 8 bits (FIG. 1c), respectively.

The respective quantizing levels (x=0–255) are represented using the corresponding reflectivities r (x) as follows:

$$(a)\ r(x) = \frac{x}{255} \cdot 10^{-0.05} + \frac{(255-x)}{255} \cdot 10^{-1.5} \quad (1)$$

$$(b)\ r(x) = 10^{-(\frac{x}{255} \cdot 1.5 + \frac{(255-x)}{255} \cdot 0.05)} \quad (2)$$

$$(c)\ r(x) = \left( \frac{x}{255} \cdot 10^{-0.05/3} + \frac{(255-x)}{255} \cdot 10^{-1.5/3} \right)^3 \quad (3)$$

The graphs of FIGS. 1a, 1b and 1c show the results obtained by converting the $(2^{6\times 3})$colors on the lattices of each color space to a CIE1976L*u*v* colorimetric system and by presuming the distribution of color differences $$\Delta E^* = \sqrt{(\Delta L^*)^2 + (\Delta u^*)^2 + (\Delta v^*)^2}\ ,$$

each between adjacent lattices when the above three conversions are performed.

As shown in FIG. 1a, when a signal having a value proportional to the quantity of light (reflectivity) is quantized, it will be seen that although the color difference for the peak of the frequency is small, the frequency expands to large color difference (the frequency becomes "0" when $\Delta E^* \geq 2.8$).

As shown in FIG. 1b, when a signal having a value proportional to the logarithm (density) of the detected quantity of light is quantized, it will be seen that the distribution is large compared to the case (a) whereas dispersion of the frequency is small compared to the case (a) (the frequency becomes "0" when $\Delta E^* \geq 1.8$).

As shown in FIG. 1c, when a signal having a value proportional to the cubic root of the detected quantity of light (reflectivity) is quantized, dispersion of the frequency can further reduced (the frequency is "0" when $\Delta E^* \geq 1.2$). This means that the unevenness of color differences in the color space is small, so that quantization using the cubic root of the detected quantity of light (reflectivity) reduces the redundancy of the color image signal. Also even if the colors on the lattices are converted to the CIE1976L*a*b* color representing system, the distribution of color differences shows a similar trend.

The production of color image using color image signals will now be described. Recording gradation is controlled such that the values of color image signals to be recorded (recording color image signals) are proportional to the cubic root of the record reflectivitis when bi-level recording is performed using three kinds (cyan, magenta and yellow) of toner.

Table 1 below shows one example of the characteristic of a first-degree and a second-degree colors in a digital color printer and the recorded reflectivity of recording paper.

TABLE 1

|  |  | recorded reflectivity | | |
|---|---|---|---|---|
|  |  | r | g | b |
| PAPER | W | 0.843335 | 0.812831 | 0.812831 |
| 1st-DEGREE | C | 0.016406 | 0.197242 | 0.473151 |
| COLORS | M | 0.537032 | 0.026002 | 0.204174 |
|  | Y | 0.758578 | 0.691831 | 0.113501 |
| 2nd-DEGREE | R | 0.530884 | 0.031623 | 0.027227 |
| COLORS | G | 0.023174 | 0.177828 | 0.085114 |
|  | B | 0.029854 | 0.014125 | 0.165959 |
| 3rd-DEGREE | K | 0.033113 | 0.018836 | 0.028184 |

TABLE 1-continued

| COLORS | recorded reflectivity | | |
|---|---|---|---|
| | r | g | b |

Assume that Neugebauer equation holds in a color printer having a characteristic of first-degree colors (C, M, Y), second-degree colors (R, G, B), a third-degree color (K) and recording paper (W) as shown in Table 1 and that the number of gradations of each of cyan, magenta and yellow is "64". Also assume that, for the recording gradation characteristics, (a) the value of the recording image signal is proportional to the recorded reflectivity, (b) the value of the recording image signal is proportional to the recorded density, or (c) the value of the recording image signal is proportional to the cubic root of the recorded reflectivity.

If the recording image signal, the recorded reflectivity, recording paper reflectivity, and solid-recorded reflectivity are represented by x, r(x), rw, and rs, respectively, for each of the above three cases, the following relationships holds:

In the case (a):

$$r(x) = \frac{x}{63} \cdot rw + \frac{(63-x)}{63} \cdot rs \quad (4)$$

In the case (b):

$$r(x) = 10^{(\frac{x}{63} \log rs + \frac{(63-x)}{63} \log rw)} \quad (5)$$

In the case (c):

$$r(x) = \left( \frac{x}{63} \cdot rw^{\frac{1}{3}} + \frac{(63-x)}{63} \cdot rs^{\frac{1}{3}} \right)^3 \quad (6)$$

Neugebauer equation is well-known, but, if necessary, see J. A. C. Yule's "Principles of Color Reproduction", John Wiley & Sons, Inc., (1967).

Figure 2A:
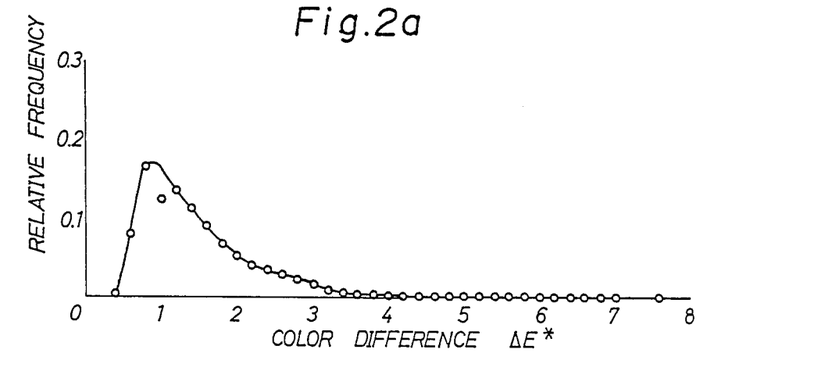
FIGS. 2a, 2b and 2c are color difference distribution characteristics in which the recording color image signal is proportional to a record reflectivity, the recording color image signal is proportional to the logarithm of the record reflectivity, and the recording color image signal is proportional to the cubic root of the record reflectivity, respectively.
Figure 2B:
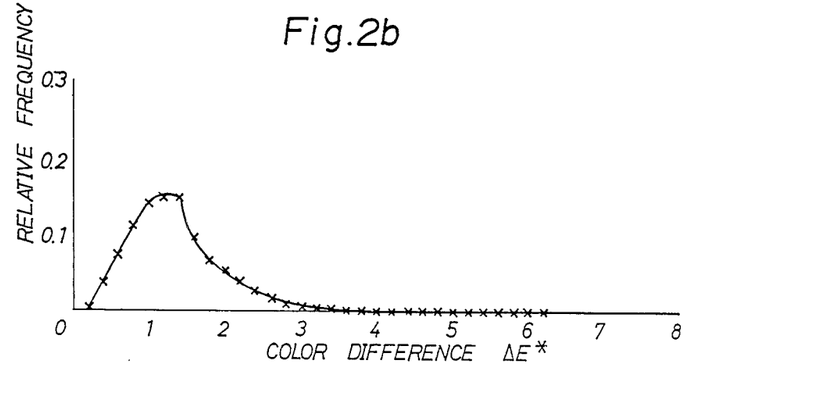
Figure 2C:
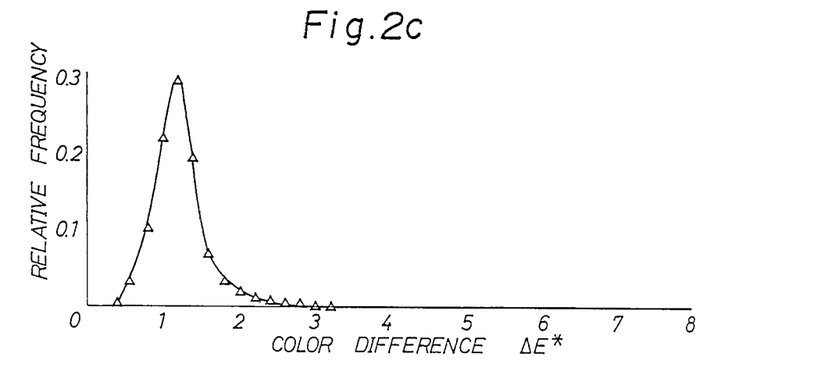

FIGS. 2a, 2b and 2c are characteristic diagrams showing the results obtained by converting ($64^3$) colors, on the lattices of a color space recordable by a digital color printer having the characteristic shown in Table 1, to a CIE1976L*a*b* colorimetric system and by presuming the distribution of color differences $$(\Delta E^* = \sqrt{(\Delta L^*)^2 + (\Delta a^*)^2 + (\Delta b^*)^2})$$

each between adjacent lattices.

As shown in the same figures, in the case (a) of FIG. 2a in which the value of the recording image signal is proportional to the recorded reflectivity, it will be seen that the dispersion of frequency of the color differences is large, and there a large color difference between certain adjacent lattices (the frequency becomes "0" when $\Delta E^* \geq 7.8$).

In the case (b) of FIG. 2b in which the value of the recording image signal is proportional to the recorded density, the distribution is somewhat improved compared to the case (a), but the dispersion of the frequency is still large and the color differences between lattices are greatly uneven (the frequency becomes "0" when $\Delta E^* \geq 6.4$).

In the case (c) of FIG. 2c in which the value of the recording image signal is proportional to the cubic root of the recorded reflectivity, it will be seen that the dispersion of frequency of the color differences between lattices is narrow and more uniform recorded ($64^3$) colors for a recordable color space are selected.

On the basis of the above facts, the equation (6) is converted as recording data namely digital density data to the following equation (7) on the basis of which the recording gradation characteristic is set:

$$R = \left( \frac{(L-1) - D}{L-1} \cdot Rw^{1/\gamma} + \frac{D}{L-1} \cdot Rs^{1/\gamma} \right)^\gamma \quad (7)$$

where $\gamma$ is a set value in a range of from "2" to "13", D is recording data (digital density data) used when each type of toner is output in a single color, and R is a recorded reflectivity (the reflectivity of each of the color components which the corresponding toners mainly absorb), L is all the number of gradations, Rw is the reflectivity of recording paper (D=0), and Rs is the reflectivity of a solid record (D=L−1).

The optimal value of above will now be described. Tables 2, 3 and 4 represent tristimulus values of first-degree colors (C, M, Y), second-degree colors (R, G, B), a third-degree color (K) in a digital color printer and recording paper (W). Table 2 corresponds to one example of toner used in a laser color printer, Table 3 corresponds to one example of printing ink, and Table 4 corresponds to one example of printing ink according to the Color Test Chart No. 21 of Japanese Image Electronic Academia.

TABLE 2

| | X | Y | Z |
|---|---|---|---|
| White | 83.94 | 85.29 | 98.66 |
| Cyan | 12.36 | 16.72 | 50.98 |
| Magenta | 33.69 | 20.56 | 32.59 |
| Yellow | 64.54 | 73.62 | 14.90 |
| Red | 28.75 | 19.47 | 6.86 |
| Green | 5.31 | 14.14 | 9.59 |
| Blue | 5.96 | 4.32 | 21.64 |
| Black | 2.70 | 3.51 | 4.50 |

TABLE 3

| | X | Y | Z |
|---|---|---|---|
| White | 88.57 | 90.45 | 99.01 |
| Cyan | 23.15 | 29.40 | 77.12 |
| Magenta | 34.76 | 17.43 | 26.19 |
| Yellow | 68.71 | 76.87 | 17.19 |
| Red | 29.46 | 15.67 | 5.85 |
| Green | 11.30 | 23.32 | 13.47 |
| Blue | 8.62 | 4.36 | 25.20 |
| Black | 4.90 | 3.47 | 5.15 |

TABLE 4

| | X | Y | Z |
|---|---|---|---|
| White | 84.33 | 85.70 | 98.35 |
| Cyan | 18.57 | 23.72 | 74.71 |
| Magenta | 33.08 | 16.85 | 19.20 |
| Yellow | 64.99 | 72.18 | 7.15 |
| Red | 37.84 | 21.63 | 4.16 |
| Green | 9.87 | 23.26 | 10.47 |
| Blue | 7.12 | 4.29 | 21.61 |
| Black | 3.23 | 3.26 | 3.70 |

Assume that Neugebauer equation holds, as described above, in a color printer using toner or printing ink having the color data shown in Tables 2 to 4. When the number of color gradations of each of cyan, magenta and yellow is "64", and the gradation recording characteristic changes depending on $\gamma$ as shown in equation (7), the distribution of color differences between gradation levels is designated by a manner mentioned below and the maximum $\Delta$Emax of the color differences is investigated, which brought about the results shown in FIGS. 3, 4 and 5.

Figure 6A:
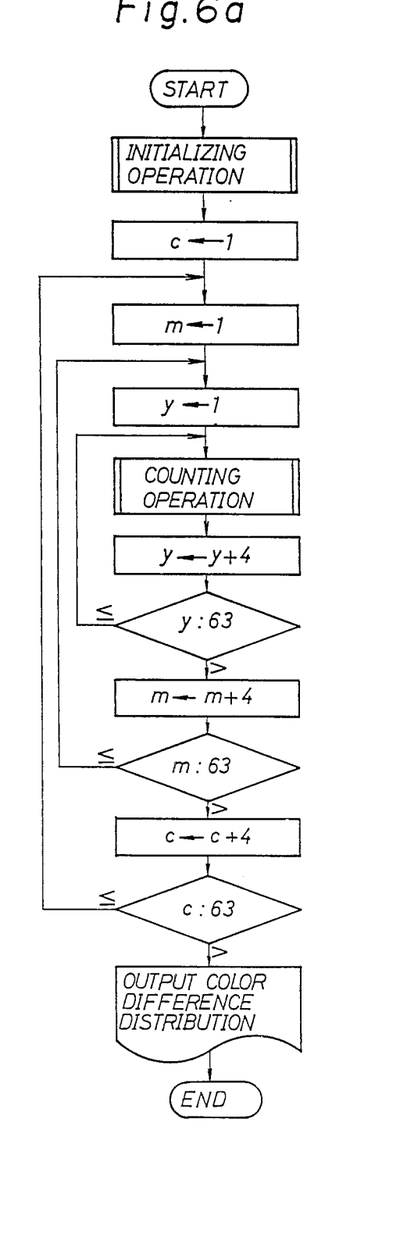
FIGS. 6a and 6b are flowcharts illustrating the presumption of a color difference distribution.
Figure 6B:
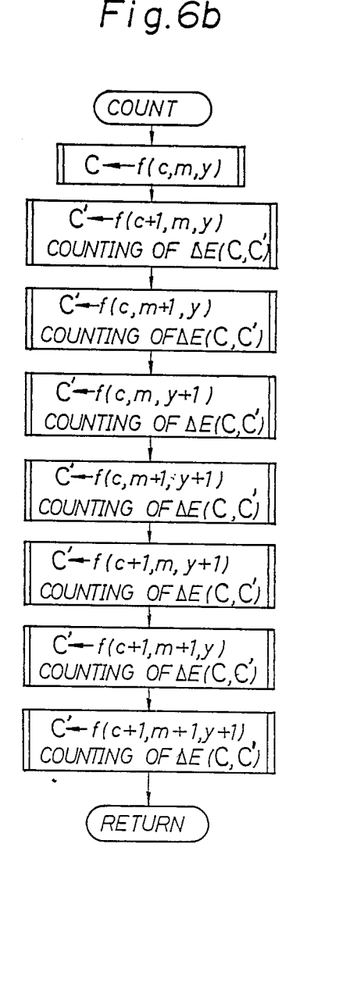

The presumption of the distribution of color differences will now be described. FIGS. 6a and 6b are flowcharts explaining the presumption of the distribution of color differences, and c, m and y represents cyan, magenta and yellow recording data sections (the range for "64" gradations is "0" to "63").

Now this method will be described in order. The initializing operation shown in FIG. 6a includes setting the initial value (=0) of a color difference frequency, and setting a predetermined value of $\gamma$. Recording data c, m and y each start with "1" (unity) and counting is repreated at every five counts until c, m and y each exceed "63". Namely, counting is repeated $16^3 = 4096$ times. After the above processing has been executed, the distribution of color differences is output and the processing ends.

The counting processing shown in FIG. 6b will now be described. First, a uniform color space (L*a*b*) of recording colors and the chromaticity coordinates C are calculated from the given recording data c, m and y. When recorded data on cyan increases by one, the chromaticity coordinate C' of a recording color is calculated, the color difference $\Delta$E between C and C' is calculated, and "1" is added to the frequency of the corresponding color differences. Similarly, when recording data on magenta increases by "1", the color difference $\Delta$E is calculated, and "1" is added to the frequency of the corresponding color differences. Similarly, when the recording data on yellow increases by "1", when the recording data on magenta and yellow increases by "1" simultaneously, when the recording data on yellow and cyan increases by "1" simultaneously, when the recording data on cyan and magenta increases by "1" simultaneously and when the recording data on cyan, magenta and yellow increases by "1" simultaneously, the corresponding color differences $\Delta$E are calculated and "1" is added to each of the frequencies of the corresponding color difference. Thus the count processing ends.

Since the maximum value of $\alpha$Emax of the color difference represents the coarseness of a portion of the uniform color space where the recordable color determined by gradation data (c, m,y) at each $\gamma$ becomes coarsest and comparison in uniformity can be performed in the color space using $\Delta$Emax. In that case, as $\Delta$Emax is smaller, the uniformity is better and color reproducibility is better.

Table 5 below shows the optimal conditions for each of the data segments shown in Tables 2 to 4, in other words a range of $\gamma$ where $\Delta$Emax becomes minimum.

TABLE 5

|  | $\Delta$Emax | |
|---|---|---|
|  | L*a*b* | L*u*v* |
| Table 2 | 6–8 | 2–3 |
| Table 3 | 3–5 | 11–13 |

TABLE 5-continued

Figure 3:
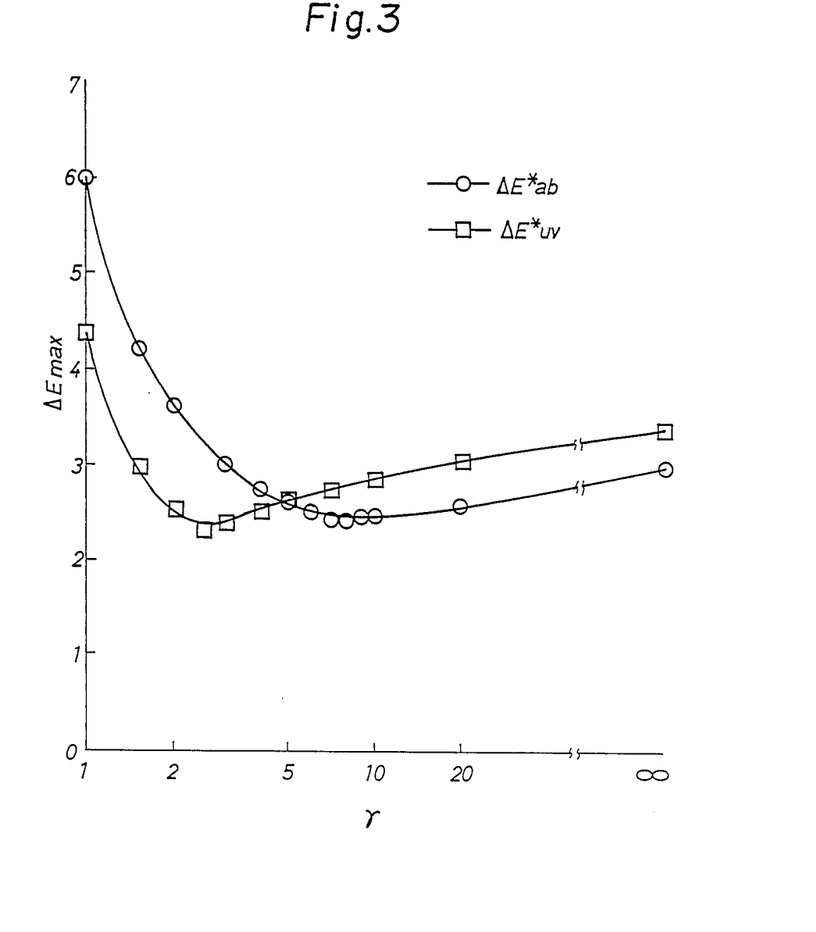
FIGS. 3, 4 and 5 illustrate a first-degree, a second-degree, and a third-degree colors in a digital color printer and tristimulus values of recording paper.
Figure 4:
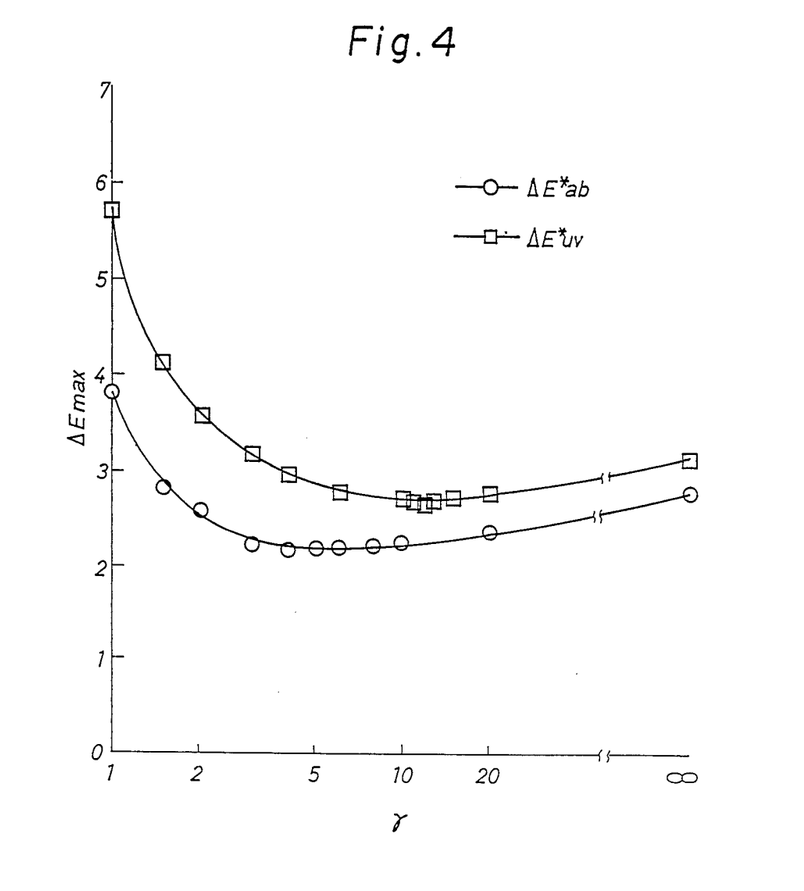
Figure 5:
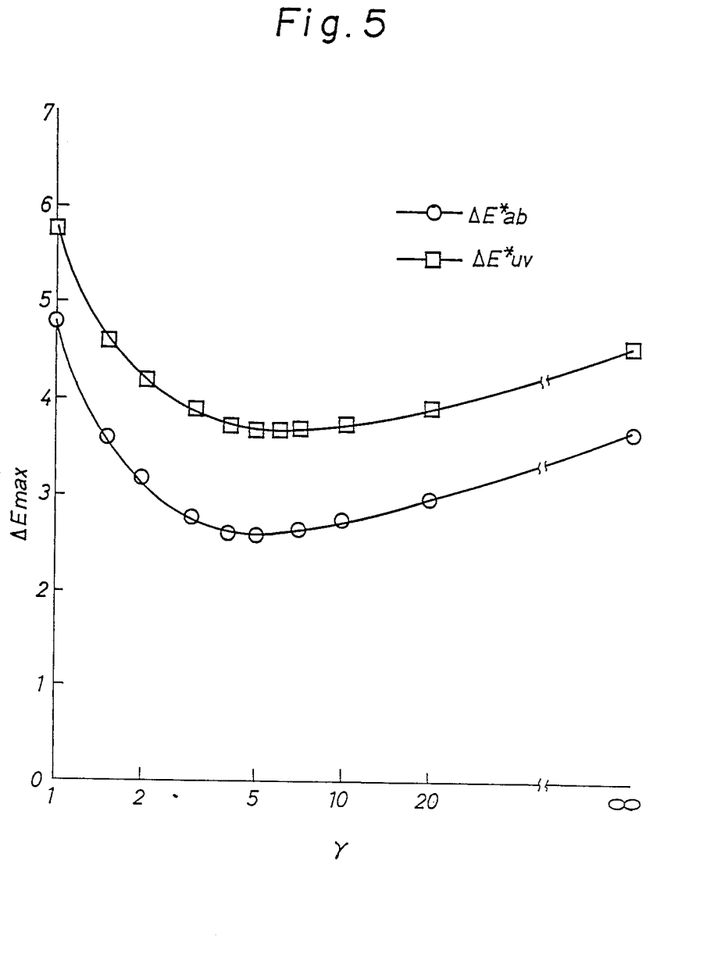

|  | $\Delta$Emax | |
|---|---|---|
|  | L*a*b* | L*u*v* |
| Table 4 | 4–6 | 5–6 | as shown in Table 5, although the optimal conditions vary depending on the tristimulus values and uniform color space, they are concentrated to $\gamma = 2$ to 13. If the value of $\gamma$ is appropriately selected in this range, the color reproducibility is improved. If the uniform color space is limited to L*a*b*, the range of $\gamma$ is reduced to 3 to 8, so that selection of $\gamma$ is easy. As shown in FIGS. 3 to 5, since fluctuations in $\Delta$Emax due to $\gamma$ are small in the neighborhood of the minimum point, it is unnecessary to select the minimum point strictly.

While aforementioned concerns tristimulus values shown in Tables 2 to 4, tristimulus values with other toners (inks) are similar to those shown in Tables 2 to 4, so that similar results are obviously obtained.

While the aforemention has illustrated recording using three kinds of toners, namely, cyan, magenta and yellow, recording of a color image using four kinds of toners including those toners and a black toner is similarly performed.

For example, when a colorless recording is performed using a black toner, the color components (a*, b* or u*, v*) can be regarded substantially as "0", so that it is only required to allow for the lightness L* for the color difference. The lightness L* is substantially proportional to the cubic root of the recorded reflectivity from its definition and means that the lightness becomes optimal at $\gamma \cong 3$. This result is contained in the above range, and it is obvious that similar results are obtained even if cyan, magenta or yellow is added.

Figure 7:
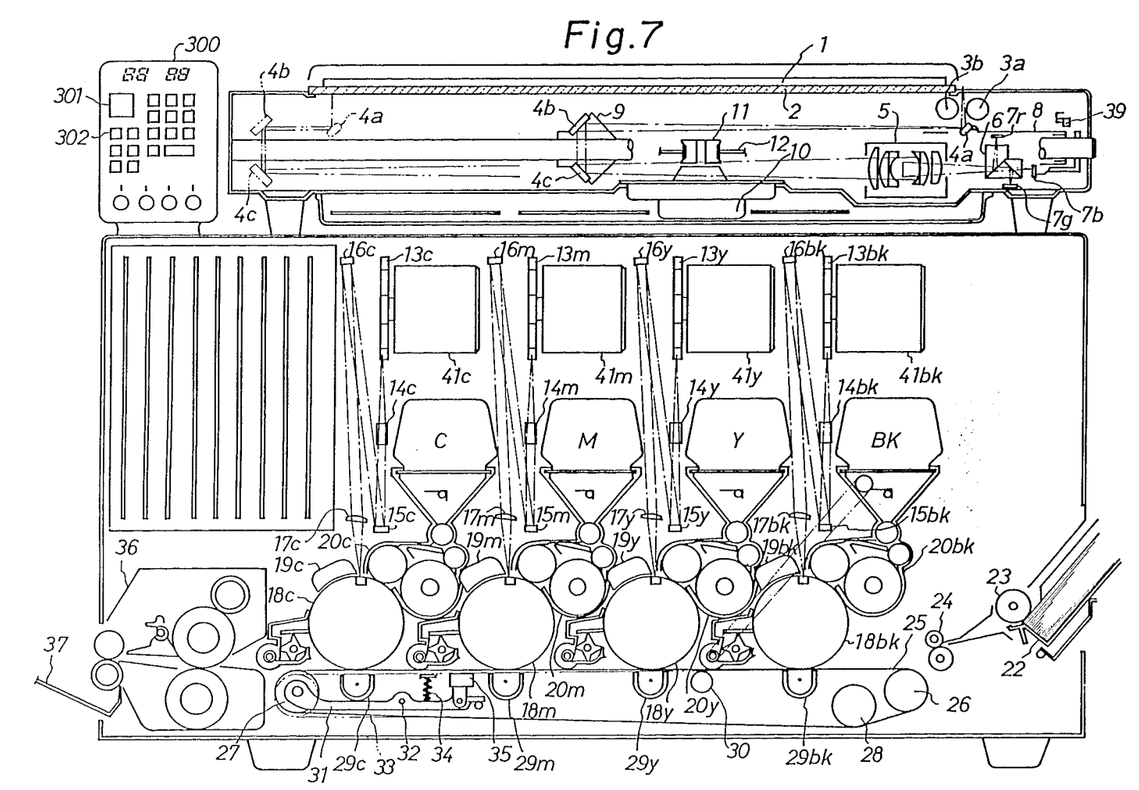
FIG. 7 is a rough schematic of a digital color copy machine as one embodiment of the present invention.
Figure 8:
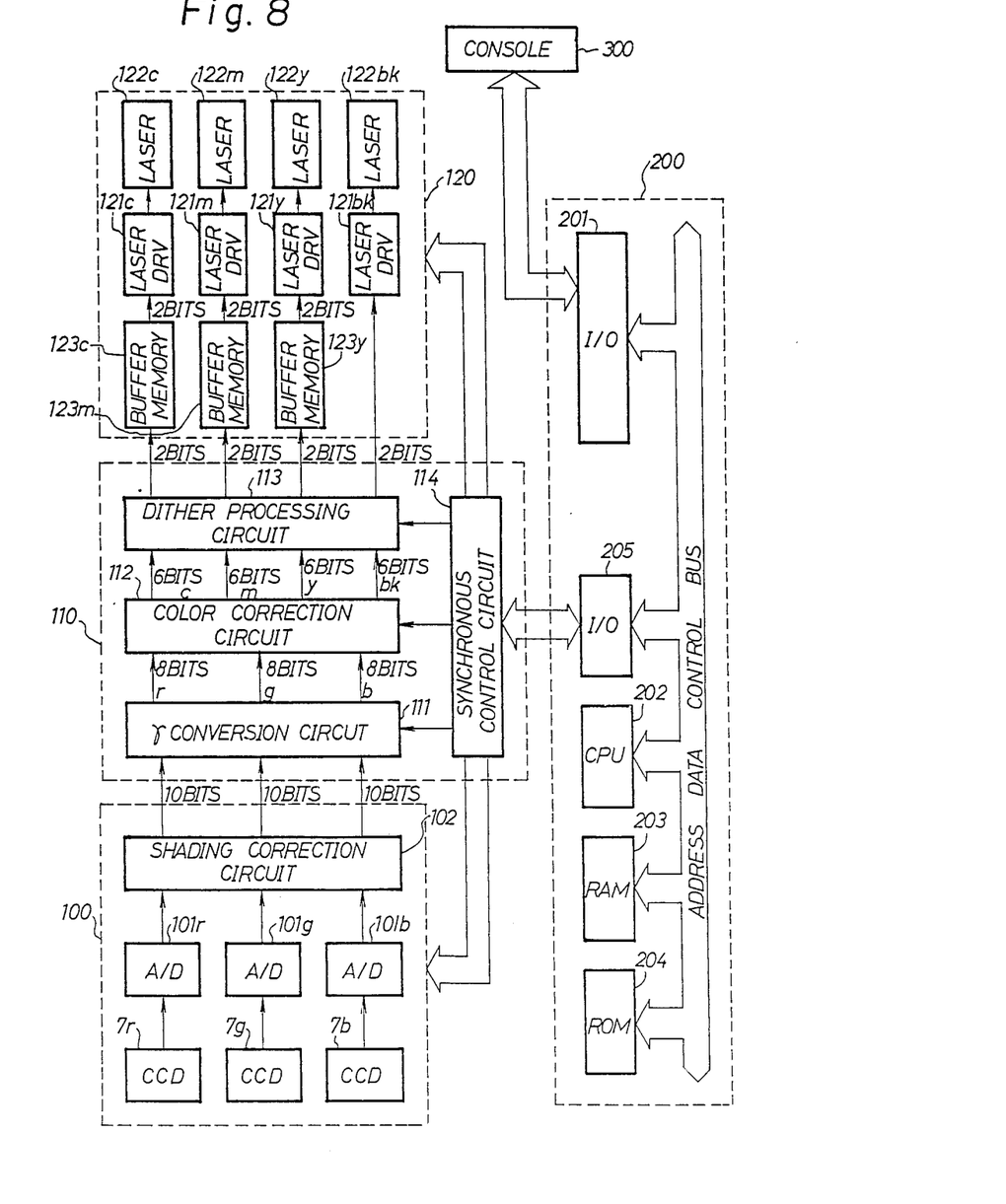
FIG. 8 is a block diagram of a control circuit of the embodiment of FIG. 7.
Figure 9:
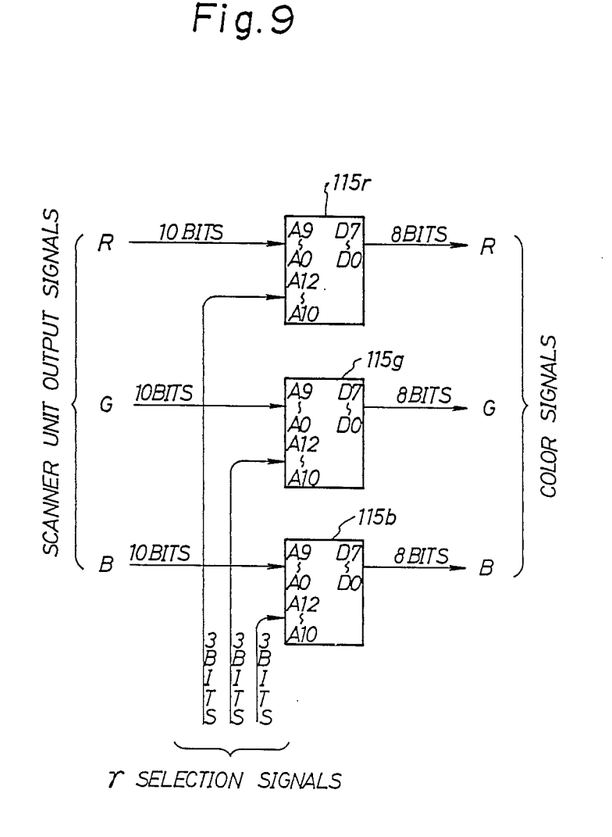
FIG. 9 is a block diagram of a Y-conversion circuit of the FIG. 8.

The structure of a digital color copy machine as one embodiment of the present invention will now be described. FIG. 7 shows a schematic view of the digital color copy machine. FIGS. 8 and 9 show a schematic view and a detailed schematic view of an electrical control circuit of the machine.

Referring to FIG. 7, a document 1 to be copied is placed on a platen (contact glass plate) 2 and illumined by fluorescent lamps 3a and 3b. The light reflected by the document is also reflected by a first, a second and a third movable mirrors 4a, 4b and 4c and entered via a focusing lens 5 into a dichroic prism 6 where the light is separated into colors of red, green and blue light R, G and B. The separated light are respectively entered into CCDs (Charge Coupled Devices) 7r, 7g and 7b as a solid-state image pickup device. Namely, red, green and blue light are entered into CCDs 7r, 7g and 7b respectively.

The flourescent lamps 3a and 3b and first mirror 4a are mounted on a first carriage 8. The second and third mirrors 4b and 4c ar mounted on a second carriage 9. Since the second carriage 9 moves at a half of the speed of the first carriage 8, the length of the respective optical paths from the document 1 to the CCDs 7r, 7g and 7b is maintained constant. For reading out document image, the first and second carriages 8 and 9 are scanned from right to left. A carriage drive pulley 11 is fixed to the shaft of a carriage drive motor 10. The first carriage 8 is coupled to a carriage drive wire 12 wound around the carriage drive pulley 11. Wire 12 is wound around a movable pulley, not shown, on the second carriage 9. Thus by forward and backward rotations of motor 10, the first and second carriages 8 and 9 move forwardly to scan an image in the document 1 and then return. The second carriage moves at a half of the speed of the first carriage 8.

When the first carriage 8 is at its home position shown in FIG. 7, it is sensed by a home position sensor 39 which comprises a reflective type photosensor. When the first carriage 8 is driven leftward by exposure scanning out of the home position, the sensor 39 does not senses light (non-detection of the carriage). When the first carriage 8 returns to its home position, the sensor 39 senses light (detection of the carriage) and the carriage 8 stops when the sensor senses the light.

Referring to FIG. 8, the outputs from the CCDs 7r, 7g and 7b are converted by analog/digital converters 101r, 101g and 101b to digital color image signals which are then subjected to required processing by an image processing unit 110. The resulting color image signals are then converted to recording binary color image signals for black BK, yellow Y, magenta M and cyan C. The respective binary color image signals are then input laser drivers 121bk, 121y, 121m and 121c which then drive semiconductor lasers 122bk, 122y, 122m and 122c to emit laser beams modulated by the recording color image signals (binary signals).

Returning to FIG. 7, the emitted laser beams are reflected by rotational polygon mirrors 13bk, 13y, 13m and 13c and reflected by fourth mirrors 15bk, 15y, 15m and 15c via f−0 lenses 14bk, 14y, 14m and 14c and then by fifth mirrors 16bk, 16y, 16m and 16c and illumined onto photosensitive drums 18bk, 18y, 18m and 18c via cylindrical lenses 17bk, 17y, 17m and 17c for correcting the tilt of the polygon mirror faces.

Rotational polygon mirrors 13bk, 13y, 13m and 13c are fixed to the rotational shafts of polygon mirror drive motors 41bk, 41y, 41m and 41c, respectively. The motors rotate at constant speed to rotate the polygon mirros at constant speeds. By the rotation of the polygon mirrors, the laser beams ar scanned in the direction perpendicular to the direction in which the photosensitive drums rotate (clockwise in the plane of FIG. 7), namely, in the direction along the shaft of the drums.

The respective surface of the photosensitive drums 18bk, 18y, 18m and 18c are uniformly charged by charge colotrons 19bk, 19y, 19m and 19c connected to a generator (not shown) which produces high negative voltages. When a laser beam modulated by a recording color image signal is irradiated onto the uniformly charged surface of the drum, charges on the photosensitive drum flows to the system ground of the drum body due to a photoconductive phenomenon and disappear. The high density portions of the document prevent the laser from being turned on and lower density portions of the document serves to turn on the laser. Thus, those surface portions of the photosensitive drums 18bk, 18y, 18m and 18c corresponding to the higher-density portions of the document are set to −800 volts and those surface portion of the drums corresponding to the lower density portions of the document are set to −100 volts to thereby form electrostatic latant images on the drums in accordance with changes in the density of the document. These latent images are developed by black, yellow, magenta and cyan developing units 20bk, 20y, 20m and 20c, respectively, to thereby form black, yellow, magenta and cyan toner images on the photosensitive drums 18bk, 18y, 18m and 18c, respectively.

The toner within the developing units is charged positively by the stirring of the toner and the developing units are biased to about −200 volts by a developing bias generator, not shown. Therefore, toner is deposited on those portions of the surface of each drum where the surface potential of the drum is negatively high compared to the developing bias and a toner image corresponding t the document is formed.

On the other hand, recording paper contained in a transfer paper cassette 22 is fed out by the operation of a feed roller 23 and fed to a transfer belt 25 by a resist roller 24 with a predetermined timing. The recording paper placed on the transfer belt 25 is passed sequentially under the drums 18bk, 18y, 18m and 18c as the belt 25 moves. Thus when the recording paper passes under those drums, black, yellow, magenta and cyan toner images are sequentially transferred on the recording paper by the action of the transfer colotrons 29bk, 29y, 29m and 29c under the transfer belt 25. The transferred recording paper is then fed to a thermal fixing unit 36 where the toner is fixed to the recording paper which is then discharged to a tray 37.

The transfer belt 25 which feeds the recording paper from the drum 18bk toward 18c extends around an idle roller 26, a drive roller 27, and idle rollers 28 and 30. It is driven counterclockwise by the drive roller 27 which is pivoted at a left-hand end of a lever 31 pivoted to the shaft 32. A plunger 35 of a black-mode setting solenoid, not shown, is pivoted at the right-hand end of the lever 31. A compression coil spring 34 is disposed between the plunger 35 and shaft 32 to apply a clockwise torque to the lever 31.

When the black mode setting solenoid is nonconductive (in a color mode), the transfer belt 25 which places the recording paper thereon contacts the photosensitive drums 18bk, 18y, 18m and 18c, as shown by the solid line in FIG. 3. Under such conditions, when toner images are formed on all the drums by placing recording paper on the transfer belt 25, the respective toner images are transferred sequentially onto the recording paper as it moves (in a color mode). When the black mode setting solenoid is electrically energized (in a black mode), the lever 31 is rotated counterclockwise against the repulsive forces of the compression spring 34, the drive roller lowers by 5 mm, the transfer belt 25 moves away from the drums 18y, 18m and 18c, as shown by the dot-dashed lines 33 in FIG. 3, but remains contacting the drum 18bk. Under such conditions, the recording paper on the transfer belt 25 only contacts the drum 18bk, so that a black toner image alone is transferred onto the recording paper (in a black mode). Since the recording paper does not contact the drums 18y, 18m and 18c, the remaining toner adhering to the drums 18y, 18m and 18c does not adhere to the recording paper, no spots, for example, of yellow, magenta or cyan appear. Namely, in the black mode copying, a copy similar to that produced by a regular single-color black copy machine is obtained. A console board 300 has a copy start switch 301, a mode designating switch 302, other input key switches, a character display and display lamps.

Referring again to FIG. 8, the constitution of the control circuit will now be described. In a scanner unit 100, the output signals from CCDs 7r, 7g and 7b are amplified by amplifiers, not shown, and input to A/D converters 101r, 101g and 101b which convert the input analog signals to the corresponding digital color image signals which are then input to a shading correction circuit 102. The correction circuit 102 corrects uneven illumination of the CCD reading optical system and uneven sensitivity of the CCD photodetection cells to output R, G and B data of 10 bits.

In an image processing unit 110, a γ-converter circuit 111 corrects the linearity of each 10-bits color image signals outputted by the scanner unit 100, converts and compresses the corrected color image signals so as to adjust to the gradation characteristic expected by the subsequent processing circuit, and furthermore converts the color image signals so as to have a designated Y-characteristic by pressing the operation button of the console 300. The resulting color image signals of 8-bits are outputted to a color correction circuit 112.

FIG. 9 illustrates a constitution of the γ-conversion circuit 111. In the same Figure, reference numerals 115r, 115g and 115b denote ROMs (Read only Memories) which store a numerical table for signal conversion. When they receive signals from the scanner unit 100 and γ selection signals from a synchronous control circuit 114 as address data, they output 8-bits color image signals proportional substantially to the cubic root of the reflectivity of the document. In the particular embodiment, signals having levels proportional to the quantities of light photoelectrically converted by the photodetecting elements are linearly amplified and subjected to A/D conversion, the resulting digital signals having values proportional to the detected quantities o light are converted to signals having values proportional to the cubic root of the detected quantities of light using the ROMs. According to this particular embodiment, since the signals are amplified linearly at an analog processing stage, subjected to A/D conversion, and then subjected to signal conversion so as to provide signals having a values proportional to the cubic root of the detected quantities of light, aging of and unevenness in the characteristic of elements do not become a problem and stabilized signal conversion is attained.

Instead of signal conversion after the A/D conversion, signals having levels proportional to the detected quantity of light and converted photoelectrically may be amplified by amplifiers having amplifying characteristics proportional to the cubic root of the detected quantities of light and then subjected to A/D conversion.

Similarly, signals having levels proportional to the detected quantities of light detected and photoelectrically converted may be amplified by logarithmic amplifiers and subjected to A/D conversion and the resulting digital signal having values proportional to the densities may be converted to signals proportional to the cubic root of the detected quantities of light using ROM tables similar to that of FIG. 9.

However, if the analog signals are converted using logarithmic amplifiers or amplifiers having amplifying characteristics proportional to the cubic root of the detected quantities of light, as mentioned above, it is necessary to solve the problems of the varying characteristics and aging of the elements used.

The present invention is not limited o the example of quantizing levels shown in the equation (3). If signal conversion is performed resulting in signals having values proportional substantially to the cubic root of the detected quantities of light or of the reflectivities, the present invention can achieve its expected effect.

In FIG. 8, the color correction circuit 112 is operated by pressing the operation button on the console 300 to process various color signals in corresponding modes, and to output 6-bits recording color image signals c, m, y and bk representing the quantities of recording cyan, magenta and black, respectively. For example, in a regular full color mode, unnecessary color components of the respective toners used in the color correction circuit 112 are allowed for and an optimal combination of colors excellent in reproducbility is output.

A dither processing circuit 113 performs a so-called ordered dither processing in accordance with the respective inputted recording color image signals and outputs two-bits laser energizing image signals to realize a desired recording gradation characteristic.

In a printer unit 120, buffer memories 123c, 123m and 123y generate time delays each corresponding to the distance between adjacent ones of the photosensitive drums 18c, 18m, 18y and 18bk of FIG. 7 in this order, and the output color image signals from the image processing unit 110 are input to laser drivers 121c, 121y and 121bk directly or via buffer memories.

The synchronous control circuit 114 determines the timings with which the above elements are energized and adjusts the timings for the respective elements. A microprocessor system 200 controls all the elements shown in FIG. 8, namely, the copy machine. The system 200 performs transfer control in various modes set by the console 300 and performs a sequential control of the image reading and recording system, the photosensitive drum driving system, the exposure system, the charger system, the developing system, the fixing system, etc.

Reference numerals 122c, 122m, 122y and 122bk denote laser sources; 201, 205, input/output interfaces; 202, a CPU (Central Processing Unit); 203, a RAM (Random Access Memory); and 204, a ROM. These elements have the conventional well-known functions.

Figure 10:
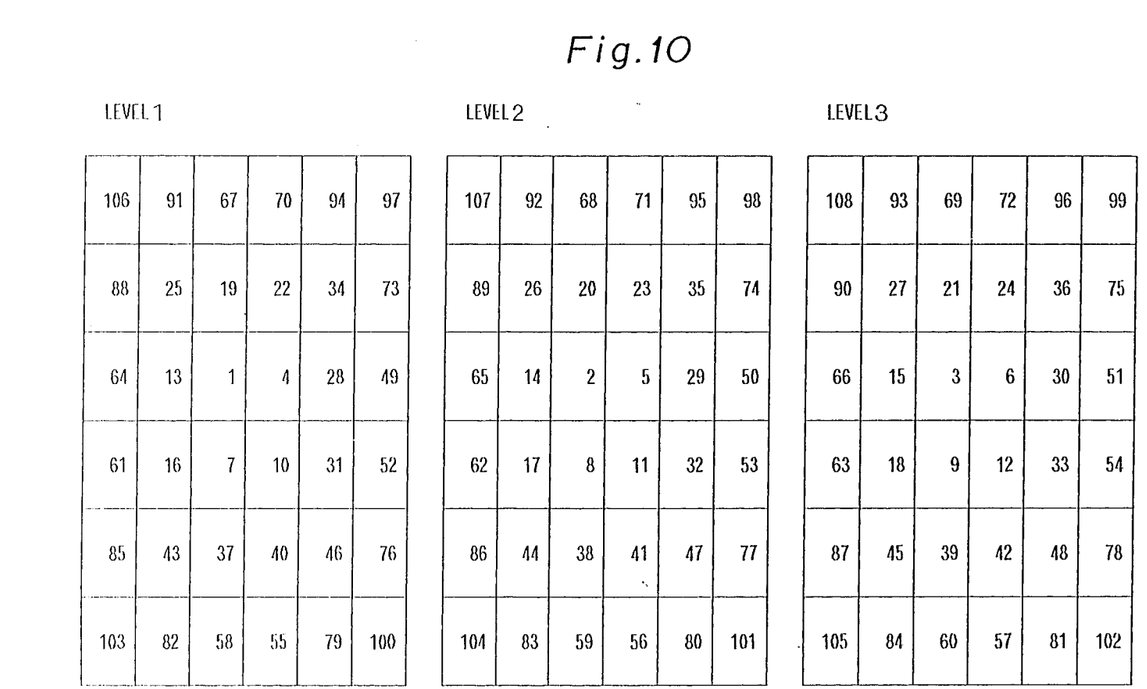
FIGS. 10 and 12 illustrate examples of threshold matrixes.
Figure 11:
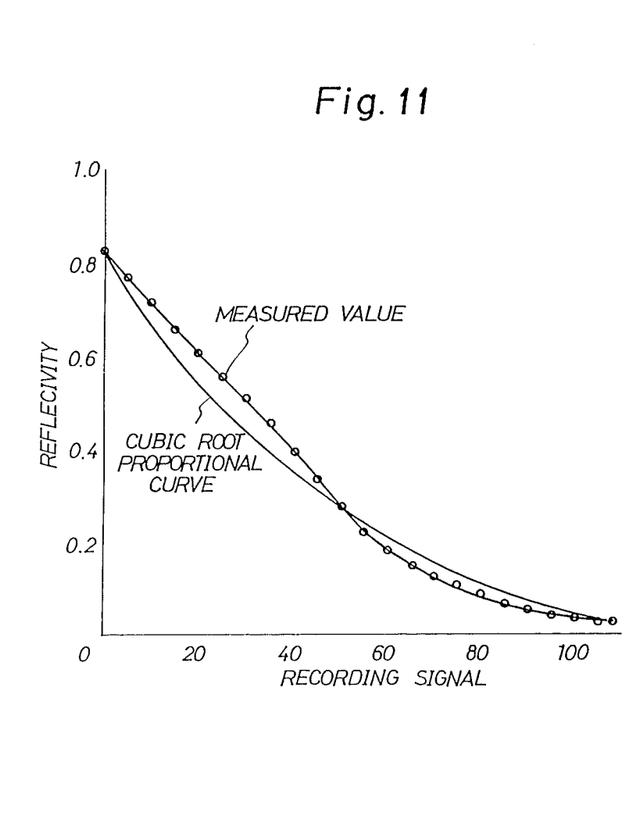
FIGS. 11 and 13 illustrate the relationship between the recording color image signal and record reflectivity obtained when the matrixes of FIGS. 10 and 12 are respectively used

One example of setting of a recording gradation characteristic will now be described. Four-level gradation recording is possible per dot by each 2-bits color image signal at the laser recording unit of the digital color copy machine shown in FIG. 7. Therefore, if $6 \times 6$ dots ordered dither processing is performed, a maximum of $(4-1) \times 6 \times 6 + 1 = 109$ gradations is recordable. FIG. 10 shows one example of a threshold matrix according to a 4-levels ordered dither processing capable of recording such 109 gradations. FIG. 11 shows the relationship between recording image signals and recorded reflectivity obtained when the threshold matrix of FIG. 10 is used. As shown in FIG. 11, it is obvious in the threshold matrix of FIG. 10 that the recording image signals are not directly related to the cubic root of the recorded reflectivity.

Recording image signal input to the dither processing circuit 113 is of 6-bits, and it is required only to process $2^6 = 64$ gradations, so that it is possible to select a combination of recording image signals and recorded reflectivity where the recording image signals are directly related to the cubic root of the reflectivity from FIGS. 10 and 11, and determine a threshold matrix capable of recording 64 gradations.

Figure 12:
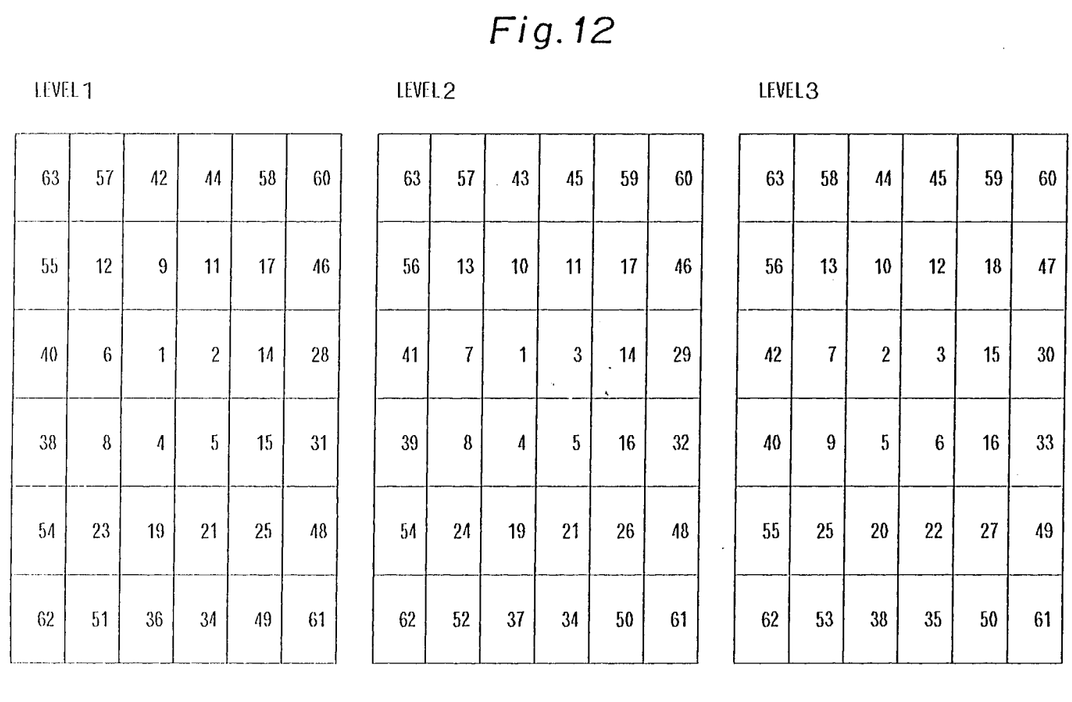
Figure 13:
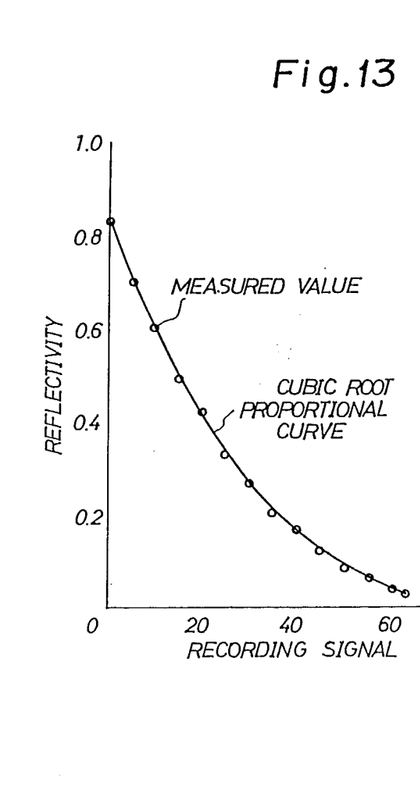

FIG. 12 illustrates calculation of a 4-level threshold matrix of 64 gradations on the basis of FIGS. 10 and 11. FIG. 13 shows a recording gradation characteristic obtained when 4-levels ordered dither processing is performed using the matrix of FIG. 12. As shown in FIG. 13, if the matrix of FIG. 12 is used, the relationship between recording image signals and the cubic root of recorded reflectivity may be substantially linear.

While, in the above, one example of setting of a recording gradation characteristic in which the values of recording image signals are proportional to the cubic root of the recorded reflectivities has been described, respective threshold value may be selected for each of the toners if the recording gradation characteristic differs depending on each of toners used (cyan, magenta, yellow and black). If the size and shape of a threshold matrix, an arrangement of threshold values as the origin (FIGS. 2a, 2b and 2c), differ, for example, by providing screen corners, each threshold value must, of course, be selected separately in accordance with the above method.

According to the present invention, only by setting a recording gradation characteristic, it is possible to obtain a uniformly recorded color for recordable color space, so that it eliminates the need for complication of the system, for example, by increasing the number of gradations.

While in the above description it is assumed that Neugebauer equation holds in a digital color printer, a similar effect is obtained by a general color printer (it is not necessary that Nuegebauer equation holds). The printer must not be a 2-level recording printer, but may be a density modulating (multilevel recording) type printer to achieve a similar effect.

In the aforementioned embodiment, each color image signal is converted to a signal having a value substantially proportional to the cubic root of a quantity of light detected by a photodetecting element as a first stage, and each of the recording gradation characteristic is set such that the value of the recording image signal is substantially proportional to the cubic root of the recorded reflectivity as a second stage. In another embodiment according to the present invention, however, only one of the first and second stages may be carried out.

Many widely different embodiments of the present invention may be constructed without departing from the spirit and scope of the present invention. It should be understood that the present invention is not limited to the specific embodiments described in this specification, except as defined in the appended claims.

What is claimed is:

1. A method of processing image information of an object to be reproduced, comprising the steps of:
   separating light from the object into a plurality of colors;
   generating electrical color image signals having levels which represent the quantities of light of the separated colors, respectively; and
   converting said color image signals to signals having values substantially proportional to the cubic root of the quantities of light from the object with respect to the respective separated colors.

2. A method as claimed in claim 1, wherein said converting step comprises a step of converting said analog color image signals into digital color image signals, and a step of converting said digital color image signals to signals having values substantially proportional to the cubic root of the quantities of light from the object with respect to the respective separated colors.

3. A method as claimed in claim 1, wherein said converting step comprises a step of converting said analog color image signals to analog signals having levels substantially proportional to the cubic root of the quantities of light from the object with respect to the respective separated colors, and a step of converting said converted analog signals into digital signals.

4. A method of processing image information of an object to be reproduced, comprising the steps of:
   adjusting recording gradation characteristics of respective colors to be recorded such that the values of color image signals to be recorded are substantially proportional to the cubic root of recorded reflectivities, respectively;
   determining recording gradations of the respective colors in accordance with said color image signals to be recorded by using said adjusted recording gradation characteristics, respectively; and
   recording respective color images in accordance with said determined recording gradations.

5. A method as claimed in claim 4, wherein said adjusting step comprises a step of executing ordered dither processings to adjust recording gradation characteristics of respective colors to be recorded such that the values of color image signals to be recorded are substantially proportional to the cubic root of the recorded reflectivities, respectively.

6. A method of processing image information of an object to be reproduced, comprising the steps of:
   separating light from the object into a plurality of colors;
   generating electrical color image signals having levels which represent the quantities of light of the separated colors, respectively:
   converting said color image signals to signals having values substantially proportional to the cubic root of the quantities of light from the object with respect to the respective separated colors;
   adjusting recording gradation characteristics of respective colors to be recorded such that the values of said converted signals to be recorded are substantially proportional to the cubic root of recorded reflectivities, respectively;
   determining recording gradations of the respective colors in accordance with said signals to be recorded by using said adjusted recording gradation characteristics, respectively; and
   recording respective color images in accordance with said determined recording gradations.

* * * * *